United States Patent Office.

HENRY GRAF, OF SEBEWAING, MICHIGAN.

PLASTERING COMPOSITION.

SPECIFICATION forming part of Letters Patent No. 291,508, dated January 8, 1884.

Application filed May 5, 1883. (No specimens.)

*To all whom it may concern:*

Be it known that I, HENRY GRAF, of Sebewaing, in the county of Huron and State of Michigan, have invented certain new and useful Improvements in Plastering Compositions, of which the following is a specification.

This invention has reference to an improved plastering composition that combines considerable durability and tenacity; and the invention consists of slaked lime, plaster-of-paris, sawdust, glue, glycerine, and cow's hair in about the following manner and proportions: Four and a half pounds of slaked lime are mixed with one pound of plaster-of-paris, four and a half pounds of sawdust, one-quarter of a pound of glue, one-sixteenth of a pound of glycerine, and one-sixteenth of a pound of cow's or other suitable hair. A sufficient quantity of water is added to the slaked lime to produce with the sawdust and cow's hair a thickly-flowing mass, to which the glue, that is dissolved in hot water, and the glycerine are added. They are then either spread on the wall or on a panel made of laths of suitable size. Panels or sections which are so formed are nailed to the wood-work of the ceiling or walls and the joints filled with plaster-of-paris or mortar. The panels can also be cut by means of saws into pieces of any required size. The surface is finally whitewashed, calcimined, painted, or papered, as desired.

The plastering composition has a tenacity similar to paper-pulp, is very strong and durable, forms a better protection of the walls against moisture, is considerably cheaper than the plastering usually employed, and can be attached to the laths with wooden pegs.

Having thus described my invention, I claim as new and desire to secure by Letters Patent—

A plastering composition composed of slaked lime, plaster-of-paris, sawdust, cow's hair, glue, and glycerine, prepared substantially as and for the purpose set forth.

In testimony that I claim the foregoing as my invention I have signed my name in presence of two subscribing witnesses.

HENRY GRAF.

Witnesses:
RICHARD MARTINI,
CHAS. W. LIKEN.